United States Patent
Gneuss et al.

(10) Patent No.: US 7,513,677 B2
(45) Date of Patent: Apr. 7, 2009

(54) EXTRUDER FOR PRODUCING MOLTEN PLASTIC MATERIALS

(76) Inventors: Detlef Gneuss, Schützenstrasse 77, D-32545 Bad Oeynhausen (DE); Wieslaw Walach, Nürburgstrasse 21, D-53842 Troisdorf (DE)

( * ) Notice: Subject to any disclaimer, the term of this patent is extended or adjusted under 35 U.S.C. 154(b) by 352 days.

(21) Appl. No.: 10/492,335

(22) PCT Filed: Oct. 11, 2002

(86) PCT No.: PCT/EP02/11391

§ 371 (c)(1), (2), (4) Date: Jun. 7, 2004

(87) PCT Pub. No.: WO03/033240

PCT Pub. Date: Apr. 24, 2003

(65) Prior Publication Data

US 2005/0047267 A1    Mar. 3, 2005

(30) Foreign Application Priority Data

Oct. 12, 2001  (DE) ............................... 101 50 627

(51) Int. Cl.
- B29B 7/18 (2006.01)
- B29C 47/38 (2006.01)
- B29C 47/66 (2006.01)
- B29C 47/76 (2006.01)

(52) U.S. Cl. .......................................... 366/83; 366/84

(58) Field of Classification Search ................ 366/76.3, 366/75, 83, 84, 85, 86; 425/204, 209
See application file for complete search history.

(56) References Cited

U.S. PATENT DOCUMENTS

| | | | | |
|---|---|---|---|---|
| 3,310,837 A | * | 3/1967 | Wittrock | 366/76.1 |
| 3,640,669 A | * | 2/1972 | Hanslik | 425/204 |
| 3,825,236 A | * | 7/1974 | Hussmann et al. | 366/76.1 |
| 4,176,967 A | * | 12/1979 | Brinkmann et al. | 366/83 |
| 4,268,176 A | * | 5/1981 | Muller | 366/83 |

(Continued)

FOREIGN PATENT DOCUMENTS

DE    4001986    9/1991

(Continued)

*Primary Examiner*—Tony G Soohoo
(74) *Attorney, Agent, or Firm*—Andrew Wilford

(57) ABSTRACT

The invention concerns an extruder for producing molted plastic materials from plastic granules available on the market, by heating and mixing granules, with heated single- or double-screw extruders, and for carrying out polycondensation or polymerization using part of a multiple-screw extruder and by means of vacuum chambers for removing the constituents of low molecular weight and/or foaming agents or the like, for obtaining larger molecules and hence a higher viscosity, and for increasing the mechanical strength of plastic materials produced from said molten material. The invention aims at designing said extruder such that the molten material can be processed in thin layers enabling exposure of large surfaces in contact with the vacuum, and hence a molten plastic material ensuring desired levels of degassing and polymerization using simple means. Therefor, the envelopes of the stems of the screws (7) are mutually spaced apart at least in the polycondensation zone of said extruder part with multiple screws (6), relative to the extruder screw (4) or its shaft section (10) and relative to cylindrical zones enclosing them, by a distance not less than zero ($\geq 0$).

20 Claims, 3 Drawing Sheets

U.S. PATENT DOCUMENTS

| | | | |
|---|---|---|---|
| 5,106,198 A | | 4/1992 | Müller |
| 5,108,711 A | * | 4/1992 | Chszaniecki ................ 422/135 |
| 5,510,073 A | * | 4/1996 | Kaegi et al. ............ 264/211.23 |
| 6,190,031 B1 | * | 2/2001 | Blach et al. .................... 366/75 |
| 6,705,753 B2 | * | 3/2004 | Behling ........................ 366/85 |
| 6,838,496 B1 | * | 1/2005 | Goedicke et al. ............ 523/343 |
| 2003/0012077 A1 | * | 1/2003 | Behling ........................ 366/85 |

FOREIGN PATENT DOCUMENTS

| | | |
|---|---|---|
| DE | 196 07 662 A1 | 9/1997 |
| DE | 100 20 646 C1 | 5/2001 |
| DE | 10009843 A1 * | 9/2001 |
| WO | 0162469 | 8/2001 |
| WO | WO 0162469 A1 * | 8/2001 |

* cited by examiner

EXTRUDER FOR PRODUCING MOLTEN PLASTIC MATERIALS

BACKGROUND OF THE INVENTION

1. Field of the Invention

The invention concerns an extruder for producing melts from commercially available granulated plastics by heating and milling the granules by means of heated single-screw or twin-screw extruders, for carrying out condensation polymerization or polymerization by using a section of the extruder that is designed as a multi-screw extruder, with the use of evacuated chambers for removing low-molecular-weight constituents and/or blowing agents or the like, for obtaining larger molecules and thus higher viscosities, and for increasing the mechanical strength of the plastic produced from the melt.

2. Description of the Related Art

Commercial granulated plastics can be processed into melts in a single-screw extruder, which is suitable, for example, for the injection of plastic articles, but is also suitable for drawing filaments. However, thin plastic sheets require a tougher and stronger raw material to allow their further processing. In this regard, it is known that the single-screw extruder can be connected to venting devices, as described, for example, in the prior-art document EP 0 588 998 A1, in which raw materials of this type can be produced by passing the plastic melt through evacuated chambers. The removal of low-molecular weight constituents, such as glycol or the like, can be accomplished here by prolonged residence times of thin layers of melt in evacuated chambers. Similar venting units are disclosed, for example, in DE 100 20 646 C1 and DE 40 01 986 (U.S. Pat. No. 5,108,711). Of course, in the systems described here, the disadvantages of the relatively complicated design of the assemblies with intermeshing shafts are readily apparent, as are the disadvantages associated with the relatively high production cost of the extruder and the venting unit.

SUMMARY OF THE INVENTION

Therefore, the object of the present invention is to develop an extruder that costs a reasonable amount to produce and has a comparatively simple design, which makes it possible to process the melt in thin layers that expose a large contact surface to the vacuum and thus to produce a plastic melt by simple means that allow degassing and polymerization to the extent desired.

In accordance with the present invention, at least in the polycondensation zone of the multi-screw extruder section, the envelopes of the screw shafts are spaced apart from each other, from the extruder screw and its shaft section, and from the cylindrical zones surrounding them by a distance that is greater than or equal to zero. The screws can be driven at variable speeds to produce optimum conveying speeds by virtue of the fact that the envelopes of the screw shafts are spaced apart from each other and from parts that surround them by a distance $\geq 0$, i.e., by virtue of the fact that the screw shafts do not mesh with each other or with the extruder screw or its shaft section or with the cylindrical zones surrounding them. The fact that is essential to the conveyance of the melt is that relative notion occurs between the screw shafts themselves and/or between the screw shafts and the barrel and/or between the screw shafts and the extruder screw or its shaft section.

In addition, neither the shafts nor the barrel requires as much expensive machining, which results in advantages with respect to the cost of producing the extruder. Furthermore, due to the absence of teeth, more free surface is made available between the screw shafts themselves and between the screw shafts and the surrounding barrel and parts of the extruder screw, so that impurities in the melt, which can cause damage to the multi-screw extruder section in the case of intermeshing shafts and possibly shafts that mesh with the barrel, can also be processed here without any problems and without causing damage and excessive wear.

Another advantage is that, due to the fact that no meshing occurs, the screws can have different pitches, and this fact can be used to influence the residence times in the multi-screw extruder section and the conveyance speeds.

It was found to be advantageous to provide the screw shafts with respective drive gears that mesh with another drive gear provided on the main extruder screw. This allows trouble-free driving of the screw shafts of the multi-screw extruder section by the extruder screw or its shaft section. This means that only one drive is necessary for the plastification unit and for the multi-screw extruder section.

If the screw shafts are mounted in a guide, the guide can be mounted in such a way that it is stationary relative to the casing, so that only the screw shafts rotate in the guide. However, it is also possible for the guide to be supported in the casing itself, so that the screw shafts rotate in the guide, and the guide itself can rotate in the However, it is also advantageous if the guide is rigidly connected with the shaft section, and the gear wheels mounted at the ends of the toothed shafts run in ring gears of the casing.

In accordance with the invention, another possibility is for the there to be two such drive gears on each of the screw shafts meshing with a ring gear. This allows the toothed shafts to rotate about their own axes and additionally to rotate about the shaft section.

If different ring gears and/or ring gears are provided in the multi-screw extruder section, then different screw shafts can be driven at different speeds, depending on the gear ratios. Of course, another possibility consists in assigning a variable-speed motor to each ring gear to allow the screw shafts to be rotationally driven at variable speeds.

The invention is explained below with reference to the embodiments of screw extruders illustrated in the drawings.

DETAILED DESCRIPTION OF THE INVENTION

Figure 1:
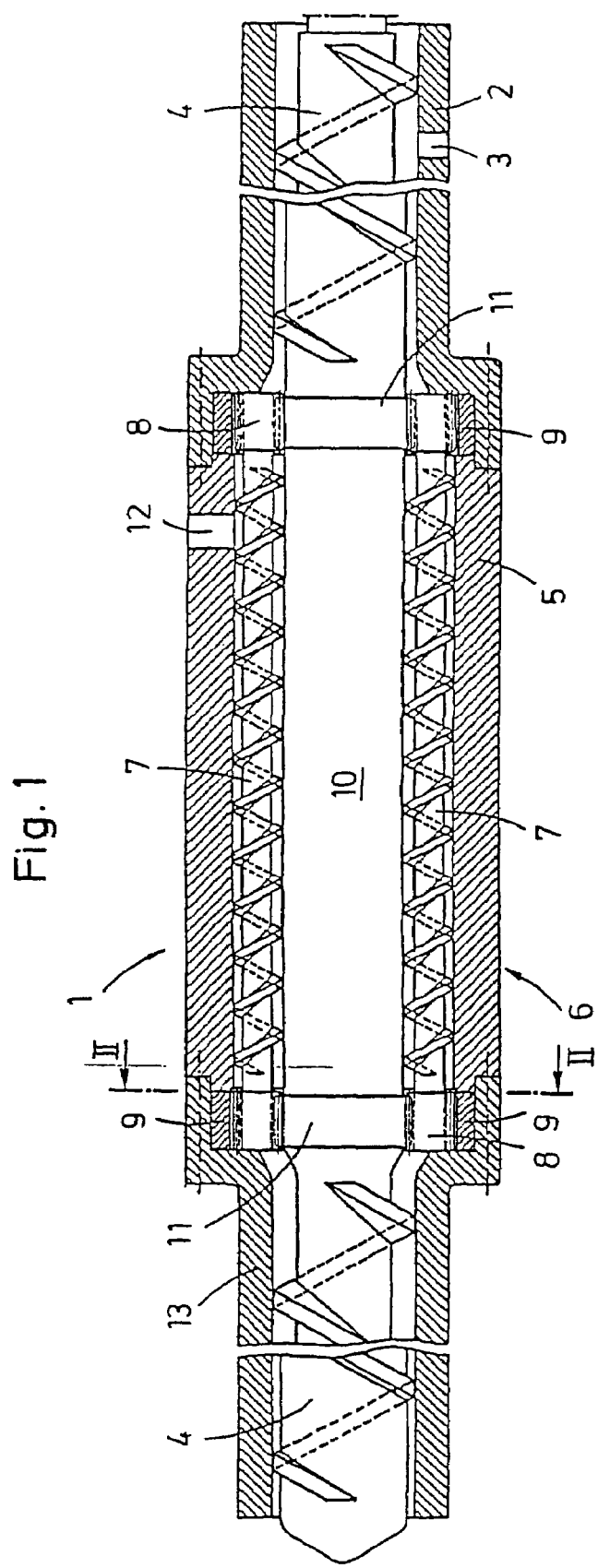
FIG. 1 shows a combined single-screw and multi-screw extruder with the shaft regions shown in section.
Figure 2:
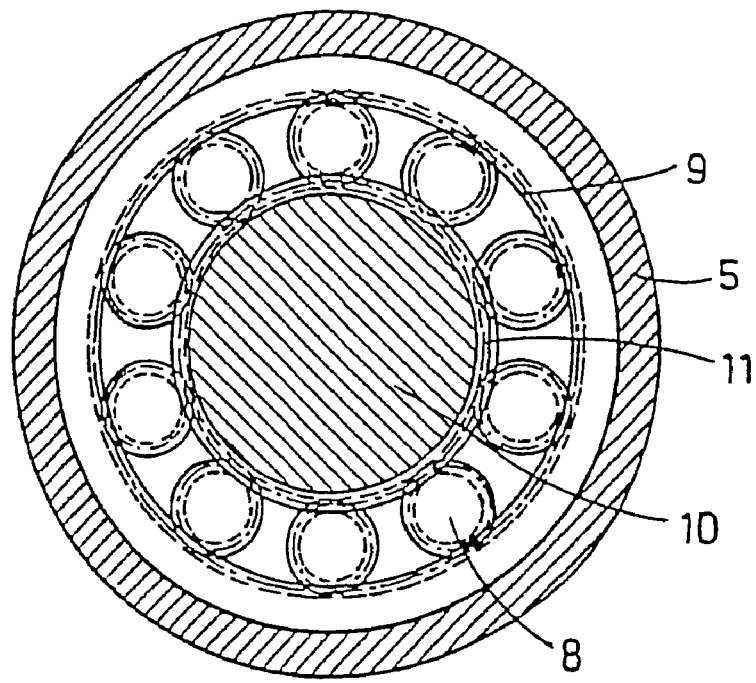
FIG. 2 shows a cross section of the extruder in FIG. 1 at the section of the extruder that is designed as a multi-screw extruder.

FIG. 1 shows an extruder 1, the barrel 2 of which is provided with an additional feed channel 3 for metering in any possible additives. The extruder 1 has an extruder screw 4 driven by drive mechanisms (not shown) from the right end shown in section. The casing 5 of a section 6 of the extruder that is designed as a multi-screw extruder is joined to the barrel 2, or the barrel 2 makes a stepped transition into the casing 5 of a section 6 of the extruder that is designed as a multi-screw extruder. In the multi-screw extruder section 6, several (ten in the present embodiment, see FIG. 2) screw shafts 7 arranged parallel to the axis are provided, each provided with toothed journals 8 at each end. Each of these screw shafts 7 meshes with internal teeth of the casing 5. In the present embodiment (FIG. 1), an internally toothed ring gear 9 or similar guide structure that provides support is inserted or mounted in the casing 5 at both ends or is formed as a single piece with it. The extruder screw 4 passes through the casing 5 with a shaft section 10 on which ring gears 11 with external teeth are rigidly mounted at both ends to prevent them from rotating. As FIG. 1 shows, the shaft section 10 may be cylindrically designed, that is have a cylindrical outer surface. However, it is always possible to provide a helical design here for advancing the melt axially. The casing 5 is provided with a vacuum channel 12 connected to a vacuum pump (not shown), e.g., a Gaede mercury pump or a diffusion pump. The casing 5 is closed at the delivery or output end by an end section 13, through which the extruder screw 4 passes.

The screw shafts 7 reach, or their threads are tangent to, the outer cylindrical surface of the shaft section 10 or the outer surface (envelope) of a helically designed shaft section 10.

The following manner of operation is achieved in this way:

When the extruder screw 4 is driven, granulated plastic fed in through the feed channel 3 is picked up, melted, for example, on the heated wall of the barrel 2, and moved by the screw threads of the driven extruder screw 4 toward and into the annular multi-screw extruder section 6. The design of the extruder screw 4 conforms to an extruder screw adapted to the raw material to be processed, such that in FIG. 1, as one possible embodiment, the pitch of the screw threads decreases toward the multi-screw extruder section 6 and thus, on the one hand, conforms to the decreasing volume during melting, but, on the other hand, makes available the working pressure required from the multi-screw extruder section 6. In the multi-screw extruder section 6 itself, the screw shafts 7 with their toothed journals 8 are driven by the two ring gears 11, which are fixed on the shaft section 10 of the extruder screw 4 to prevent them from rotating relative to it. Furthermore, the toothed journals 8 engage the stationary ring gears 9, so that the screw shafts 7 rotate not only about their own axes, but also orbit about the axis of the shaft section 10 of the extruder screw 4. The rotating screw shafts 7 run with their screw crests approximately tangent to outer surface of the shaft section 10 of the extruder screw 4, and the melt, which has been thoroughly milled until it is thin, is able to release gases into the evacuated space surrounded by the casing 5, which are then removed through the vacuum channel 12 by a pump.

Figure 3:
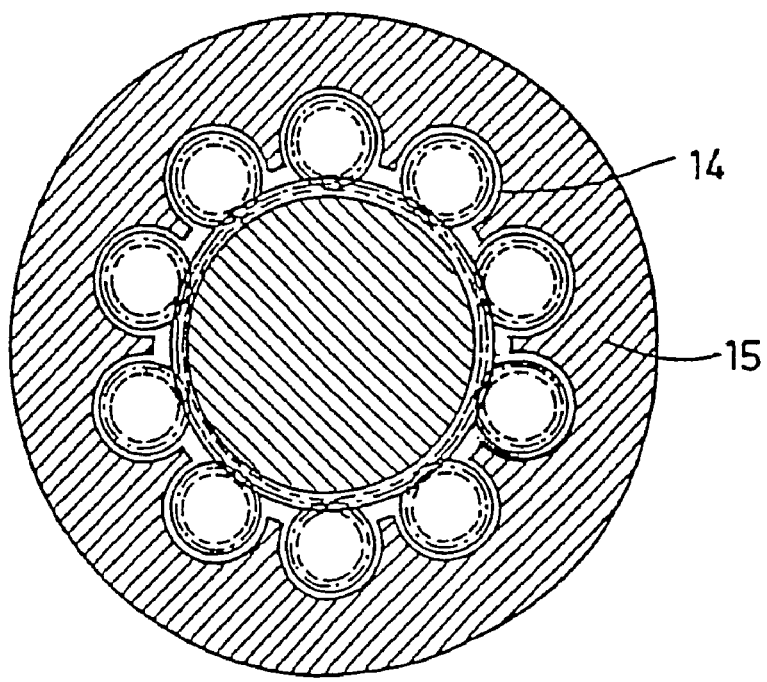
FIG. 3 shows a cross section of the section of the extruder that is designed as a multi-screw extruder in accordance with a second version.

In accordance with the alternative illustrated in FIG. 3, to keep the melt passing through the multi-screw extruder section 6 as thin-walled as possible, the screw shafts 7 are held in respective seats 14 of guides 15. The seats 14 conform to the peripheral shape of the screw shafts 7, so that here the layer of melt is kept as thin-walled as possible. The screw shafts 7 in FIG. 3 do not mesh with ring gears 9, but rather are held in the stationary guides 15 in such a way that they can rotate only about their own axes and do not orbit about the section 10.

Figure 4:
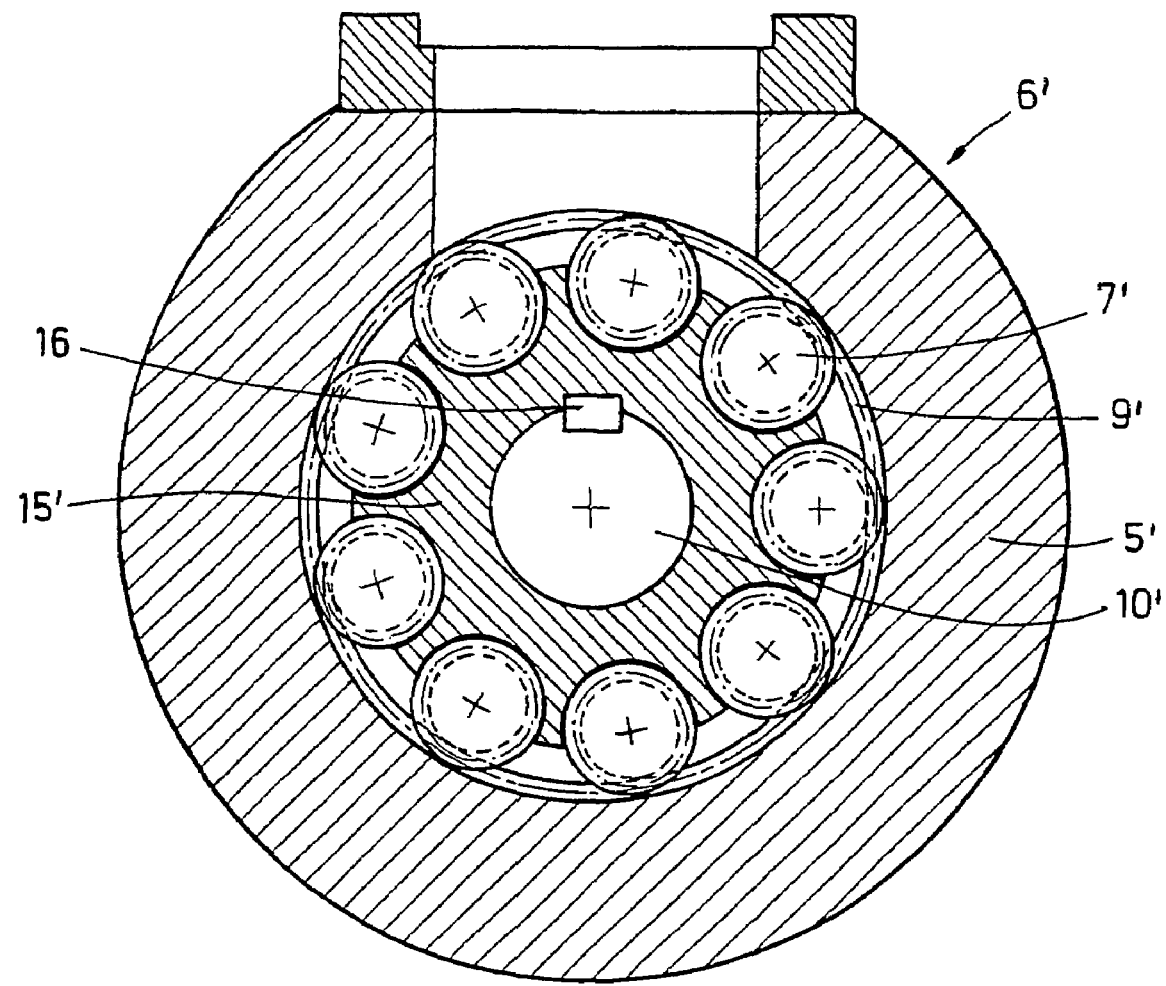
FIG. 4 shows a cross section of the section of the extruder that is designed as a multi-screw extruder in accordance with a third version.

FIG. 4 shows a multi-screw extruder section 6' equipped with nine screw shafts 7. The screw shafts 7' are supported in a guide 15' angularly fixed on the shaft section 10' by a spline 16 to prevent it from rotating.

The toothed journals of the screw shafts 7' engage a ring gear 9' mounted on the casing 5'. Rotational motion of the shaft section 10' causes the guide 15' to rotate as well. The screw shafts 7', which are supported in the guide 15', mesh with the ring gear 9' so that they not only orbit about the shaft section 10', but also are caused to rotate about their own axes.

If different ring gears 9' are provided here (not shown), which mesh with different toothed journals, then, depending on the gear ratios, different speeds of the screw shafts 7' can be realized.

The outlet section of the extruder screw 4 extends beyond the outlet of the annular multi-screw extruder section 6. Here too, a relatively high lead of the screw threads is provided at first, which flattens out toward the free end due to the increasing core diameter.

The invention claimed is:

1. An extruder comprising:
    an elongated barrel centered on a barrel axis and having a polycondensation region;
    an extruder screw extending axially in the barrel through the region and having an outer surface;
    a guide in the barrel;
    a plurality of shaft screws extending along and rotatable in the region about respective shaft-screw axes parallel to the barrel axis, partially surrounded by the guide, having axially opposite ends, and having outer surfaces spaced from the guide and from the outer surface of the extruder screw by a distance at least equal to 0;
    means for rotating the shaft screws about the respective shaft-screw axes.

2. The extruder in accordance with claim 1 wherein each screw shaft has at least one gear, the extruder screw having at least one ring gear fixed rotationally to the shaft section of the central extruder screw.

3. The extruder in accordance with claim 2, wherein the guide is mounted on or supported in the barrel at the polycondensation region.

4. The extruder in accordance with claim 2 wherein the screw shafts each have two ends each provided with a respective one of the gears, the barrel being provided with a pair of axially spaced outer ring gears meshing with the screw-shaft gears, the extruder screw also being provided with a pair of inner ring gears also meshing with the screw-shaft gears, each screw-shaft gear meshing outwardly with a respective outer ring gear and inwardly with a respective inner ring gear.

5. The extruder in accordance with claim 1 wherein the guide is fixed rotationally on the shaft section, and the screw shafts each have a gear wheel, the barrel having a ring gear meshing with the gears.

6. The extruder in accordance with claim 5, wherein the ring gear is connected to the barrel or has teeth formed by the barrel.

7. The extruder in accordance with claim 1 wherein the the guide is formed with respective seats that surround the screw shafts at a small spacing.

8. The extruder in accordance with claim 2 wherein the screw-shaft or ring gears are different.

9. The extruder in accordance with claim 8, wherein the different ring gears and screw-shaft gears have different gear ratios.

10. The extruder in accordance with claim 8 wherein a different ring gear or ring gear is provided for each screw shaft.

11. The extruder in accordance with claim 8 wherein the different ring gears are rotatably supported in the barrel and can be driven by motors.

12. The extruder in accordance with claim 1 wherein the barrel of the multi-screw extruder section is provided with a vacuum channel for connection to a vacuum pump.

13. The extruder in accordance with claim 1 wherein the shaft section has a cylindrical outer surface.

14. The extruder in accordance with claim 1 wherein the shaft section has at least one helical screwthread by which the melt can be axially conveyed in or against a direction of advance of the extruder screw.

15. The extruder in accordance with claim 14 wherein ring gears forming part of the means are formed by the helix.

16. The extruder in accordance with claim 2 wherein teeth of the screw-shaft gears and of the ring gears are designed as straight and/or as oblique teeth.

17. The extruder in accordance with claim 2 wherein the screws of the screw shafts have different pitches.

18. The extruder defined in claim 1, further comprising means including an outlet in the region of the barrel for withdrawing gases from the region.

19. An extruder comprising:

an elongated barrel centered on a barrel axis and having a polycondensation region;

an extruder screw extending axially in the barrel through the region and having in the region a shaft section having an outer surface;

a guide in the barrel;

a plurality of shaft screws extending along and rotatable about respective shaft-screw axes in the region parallel to the barrel axis, partially surrounded by the guide, having axially opposite ends, and having outer surfaces spaced from the guide and from the outer surface of the extruder screw by a distance at least equal to 0;

a respective gear fixed at each end of each of the shaft screws;

a pair inner ring gears fixed on the extruder screw and meshing with the gears on the shaft screws; and a pair of outer ring gears fixed in the barrel and also meshing with the gears on the shaft screws.

20. The extruder defined in claim 19, further comprising means including an outlet in the region of the barrel for withdrawing gases from the region.

* * * * *